United States Patent
Brun

(10) Patent No.: US 7,447,792 B2
(45) Date of Patent: Nov. 4, 2008

(54) METHOD FOR DISTRIBUTING A VIDEO SPLIT UP IN SPATIAL PIECES

(75) Inventor: Veronique Brun, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 434 days.

(21) Appl. No.: 10/503,578

(22) PCT Filed: Jan. 21, 2003

(86) PCT No.: PCT/IB03/00149

§ 371 (c)(1), (2), (4) Date: Aug. 4, 2004

(87) PCT Pub. No.: WO03/067887

PCT Pub. Date: Aug. 14, 2003

(65) Prior Publication Data

US 2006/0020989 A1   Jan. 26, 2006

(30) Foreign Application Priority Data

Feb. 7, 2002   (EP)   .................................. 02290295

(51) Int. Cl.
*G06F 15/16* (2006.01)
*H04L 29/06* (2006.01)
*H04L 9/00* (2006.01)
*H04N 7/16* (2006.01)

(52) U.S. Cl. ........................... 709/231; 725/46; 705/51; 713/150

(58) Field of Classification Search ........................ None
See application file for complete search history.

(56) References Cited

U.S. PATENT DOCUMENTS

| | | | | |
|---|---|---|---|---|
| 5,745,556 | A * | 4/1998 | Ronen | 379/127.05 |
| 6,801,947 | B1 * | 10/2004 | Li | 709/231 |
| 6,889,327 | B1 * | 5/2005 | Inoha | 713/193 |
| 6,931,534 | B1 * | 8/2005 | Jandel et al. | 713/176 |
| 2001/0009580 | A1 | 7/2001 | Ikeda | |
| 2002/0105529 | A1 * | 8/2002 | Bowser et al. | 345/629 |
| 2002/0172368 | A1 * | 11/2002 | Peterka | 380/278 |
| 2003/0061477 | A1 * | 3/2003 | Kahn et al. | 713/150 |
| 2003/0093790 | A1 * | 5/2003 | Logan et al. | 725/38 |
| 2003/0105718 | A1 * | 6/2003 | Hurtado et al. | 705/51 |

FOREIGN PATENT DOCUMENTS

| | | |
|---|---|---|
| EP | 0696121 A1 | 2/1996 |
| WO | WO0031964 A1 | 6/2000 |
| WO | WO0064183 | 10/2000 |
| WO | WO0178395 A1 | 10/2001 |

* cited by examiner

*Primary Examiner*—Wen-Tai Lin

(57) ABSTRACT

A video distribution method, apparatus, and system for distributing a video divided into a plurality of spatial pieces encoded separately as independent video streams. The distribution method includes transmitting a plurality of the independent video streams to one or more users, conditionally offering at least one other video stream, to one or more users, and transmitting said other video stream to the user(s) who accepted the conditional offer. The at least one other video stream may be one of said plurality of spatial pieces encoded as independent video streams and each independent video stream may be transmitted to the one or more users at different times.

13 Claims, 2 Drawing Sheets

METHOD FOR DISTRIBUTING A VIDEO SPLIT UP IN SPATIAL PIECES

This application is the U.S. National Stage of International Application No. PCT/IB03/00149, filed Jan. 21, 2003, which claims foreign priority from EP Application (EPO) 02290295.1, filed Feb. 7, 2002.

FIELD OF THE INVENTION

The invention relates to a method for distributing a video, said video being split up into a plurality of spatial pieces encoded as independent video streams.

The invention also relates to a server intended for distributing a video, said sequence being split up into a plurality of spatial pieces, said spatial pieces being encoded as independent video streams.

The invention also relates to a transmission system comprising at least a server intended for distributing a video, said video being split up into a plurality of spatial pieces encoded as independent video streams, a plurality of user terminal equipments, and a transmission network.

The invention also relates to a computer program comprising program instructions for implementing a method for distributing a video as described above, when said program is executed by a microprocessor.

The invention also relates to a video distributed according to such a distribution method.

BACKGROUND OF THE INVENTION

International patent application WO 00/64183 applied by Koninklijke Philips Electronics N.V. and published on Oct. 26, 2000 describes a game in which a video is divided into a plurality of pieces, each piece being separately encoded according to the MPEG4 standard. In the described application, the user has all the pieces at his disposal, but in a random order. The game consists in reordering the pieces of the video while the video is played.

SUMMARY OF THE INVENTION

The invention proposes another application using such a decomposition of a video into a plurality of pieces encoded separately as independent video streams.

The invention notably proposes a method for distributing a video. A video to be distributed according to the invention is split up into a plurality of spatial pieces encoded as independent video streams. And the proposed method for distributing such a video comprises:

- a step of transmitting a plurality of video streams to one or more users, freely and at different times,
- a step of conditionally offering at least one other video stream, called missing video stream, to one or more users,
- a step of transmitting said missing video stream to the user(s) who accepted said conditional offer.

This distribution method consists in spreading the distribution of the free pieces over the time in order to arouse the interest of the user. Each time the user receives a new piece he gets a better idea of the subject and his interest progressively rises. Then a conditional offer relating to one or more missing pieces is made to the user. As the interest of the user has progressively been aroused he will be motivated to accept the conditional offer in order to get the complete video. Advantageously the missing video stream is the most relevant one.

The conditional offer is for example an offer for sale implying a payment from the user. It may also be an offer for taking advertising (for example targeted advertising) in exchange of receiving the missing video stream.

It is to be noted that International patent application WO 01/8395 describes a conditional access system in which a video is separated into an object video stream and a remaining video stream, and in which the remaining video stream is sent freely to the users while the users have to pay to receive the object video stream. Such a conditional access system is very efficient for users who have a preliminary interest in the proposed subject. For instance it is well suited for conditional access retransmission of sport events.

On the contrary, the invention is intended to build up an interest that does not exist a priori. The user who repeatedly receives free pieces of a same video will become curious, familiar with the subject, and finally will be ready to accept the conditional offer even if initially he had no specific interest for that subject.

In an advantageous embodiment, the distribution method further comprises a protection step for protecting said missing video stream against copy. For instance, protection against copy is achieved by marking the missing video stream with an identifier that is unique to the user who accepted the conditional offer.

Advantageously free pieces can be copied and transmitted from one user to another. In that way users participate to the spreading of the video and their motivation is still increased.

BRIEF DESCRIPTION OF THE DRAWINGS

The invention will now be further described with reference to the following drawings.

DESCRIPTION OF PREFERRED EMBODIMENT

The invention proposes a video distribution method applying to a video that was encoded into multiple video streams, for example using the MPEG-4 standard (ISO/IEC JTC1/SC29/WG11 N1909, October 1997, Fribourg, Switzerland).

Using the MPEG-4 standard, the video can be divided into a plurality of spatial pieces and each piece of video can be encoded as an independent video stream. In a first example the picture plan is divided in arbitrary shapes like a puzzle, and the video located in each shape is encoded as an independent video stream. In a second example, the video is divided into a plurality of objects (for example characters, objects, background . . . ), and each object is encoded as an independent video stream. In this second example, the shape of a piece and its position in the picture plan may change during time (for example a piece corresponding to a character may move in the picture plan as the action goes on, and its shape may vary).

Figure 1:
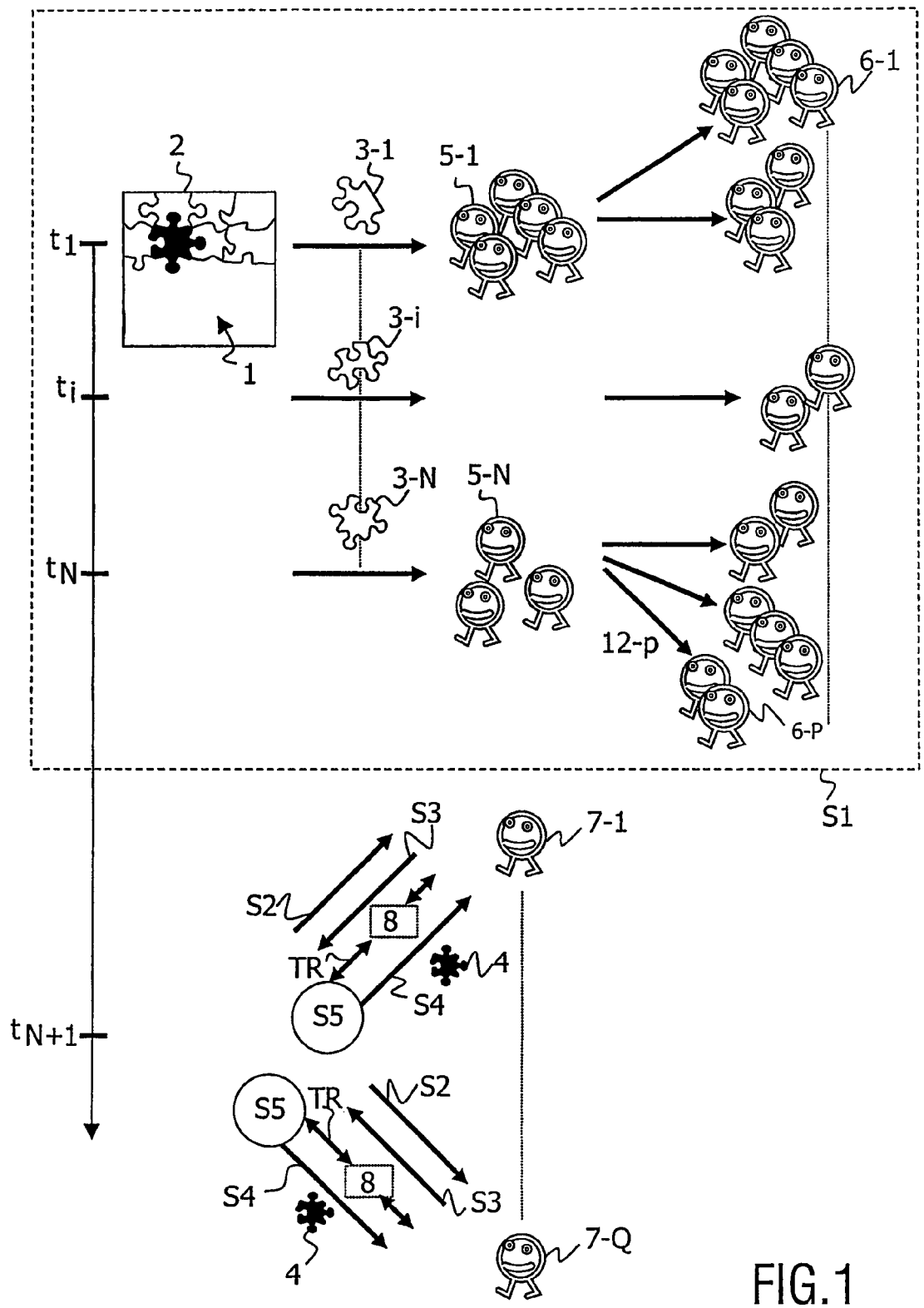
FIG. 1 is a diagram describing the steps of a distribution method according to the invention.

FIG. 1 gives a schematic representation of an example of a distribution method according to the invention. In FIG. 1, a video 1 stored in a video server 2 is split up into a plurality of pieces:

N pieces represented in white that are intended to be distributed freely, and at least one piece represented in black that is intended to be offered to users conditionally.

In FIG. 1, the N free pieces are referenced 3-1, . . . , 3-i, . . . , 3-N respectively. And the conditional piece is referenced 4.

At step S1, the N free pieces are successively distributed to users or group of users at different times $t_1, \ldots, t_i, \ldots, t_N$. The addressed user or group of users 5-1, ..., 5-N may vary during time. In an advantageous embodiment, each user can retransmit the free pieces he received at any time to any other user or group of users. In that way each user has the ability to participate in spreading the free pieces. In FIG. 1, users who receive free pieces from other users are referenced 6-1, ... 6-P.

At step S2, an offer relating to conditional piece 3 is sent to one or more users or a group of users 7-1, ..., 7-Q. Each user is free to answer the offer.

At step S3, a user answers the offer. Upon reception of such an answer, the video server 2 initiates a transaction TR with the user. It is considered that the user accepted the offer when transaction TR is successfully completed. When transaction TR is successfully completed, the video server 2 sends conditional piece 4 to the user at step S4.

Transaction TR may be of any type. For example if the offer is conditional to a payment, transaction TR is a financial transaction and it is regarded as completed when the user has successfully transmitted a reference of an account to be debited. Transaction TR is initiated by the video server 2 but it may involve a third party. For instance when transaction TR is a financial transaction, it may involve a financial transaction centre. In FIG. 1, such a third party is represented in dotted line under reference 8.

Advantageously, conditional pieces are protected against copy, in order to avoid further duplications by the users. Such protection may be obtained by marking conditional pieces with an identifier that is unique to the user to whom they are addressed, and by preventing the reading and/or the display of a conditional piece by a user terminal equipment which identifier is different from the identifier marking said conditional piece.

At step S5, before transmitting a conditional piece to a user, the video server 2 marks said conditional piece with the unique identifier of the user.

For instance such marking may consist in ciphering the conditional piece by using the unique identifier of the user as a ciphering key. The only user terminal equipment that will be able to use the conditional piece is the user terminal equipment that has the knowledge of the identifier used as a ciphering key.

For example, when the user terminal equipment is a personal computer, this identifier is advantageously the MAC (Medium Access Layer) address stored in the network board of the user terminal equipment. And when the user terminal equipment is a mobile phone, this identifier is advantageously the IMEI (International Mobile Equipment Identity) of the mobile phone. The IMEI is stored in the subscriber identity module of the mobile phone. The MAC address and the IMEI both have the advantage of being known at the video server side and at the user side.

In the embodiment described in FIG. 1, protection against copy is achieved by marking the conditional piece before transmission at the side of the video server. Alternatively, protection against copy can also be achieved by marking the conditional piece automatically after reception at the side of the user terminal.

In the embodiment described in FIG. 1, the conditional offer is sent to the user from the video server. In an alternative embodiment not represented here, the user has to go after the offer: for example he has to connect to a web site where the offer is made available. Advantageously a link is displayed at the user side, and when the user wants to get the conditional piece(s) he has just to select the link to go directly to the web site. Advantageously the web site is also used to make free pieces available to the users so that they can download one or more free pieces in which they are interested.

The embodiment described in FIG. 1 comprises a transaction IR between the video server and the user. Such a transaction is optional. For example, when the offer is conditional to taking advertising, there is no transaction. The advertising is sent together with the conditional piece so that the user has to watch the advertising before watching the conditional piece.

A specific program is needed at the user side to read/display the available video piece(s). For example this specific program is sent together with the first free piece of video. When the offer is conditional to taking advertising, this specific program also comprises instructions for automatically displaying the advertising each time the conditional piece is displayed. When enciphering is used to protect the conditional piece against copy, this specific program comprises instructions for deciphering the conditional piece before display. When the enciphering is done at the user side, this specific program also comprises instructions for automatically launching the ciphering operation after reception of the conditional piece.

Figure 2:
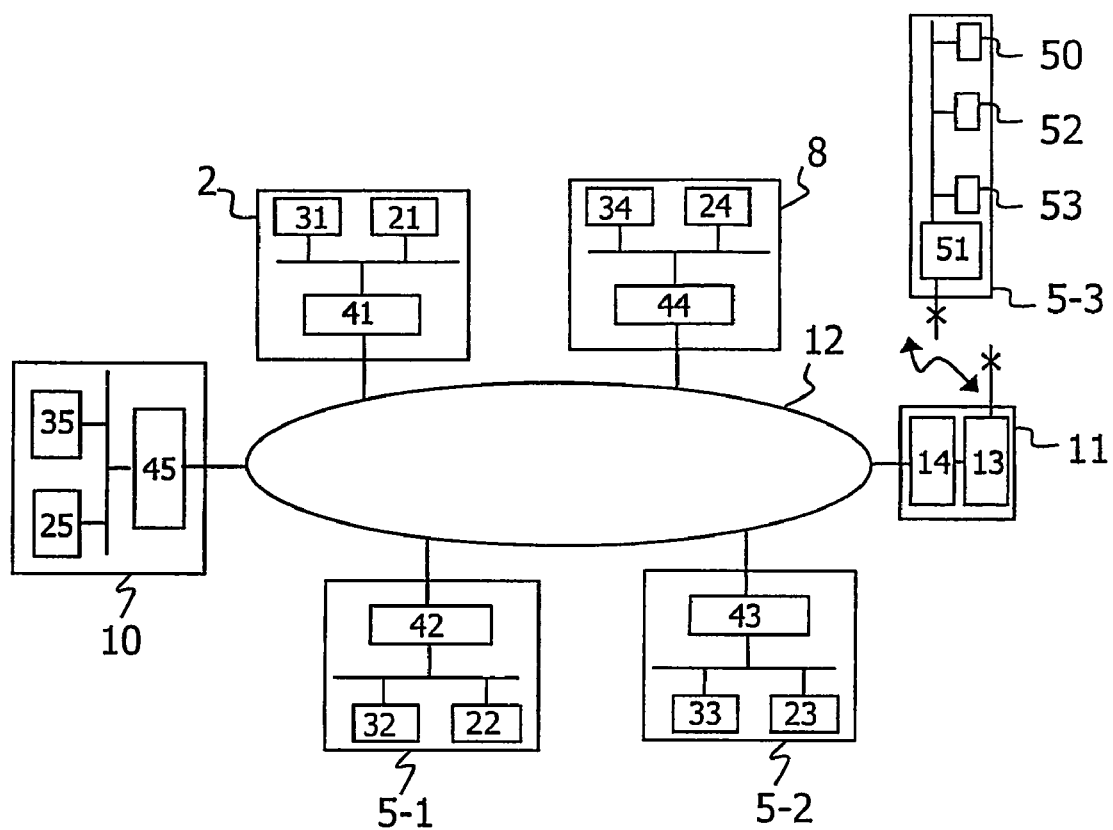
FIG. 2 is an example of a transmission system according to the invention.

FIG. 2 is a schematic representation of a transmission network according to the invention. The transmission network represented in FIG. 2 comprises a video server 2, user terminal equipments 5-1, 5-2 and 5-3, a transaction centre 8, a content provider 10, and a mobile access point 11. The mobile access point 11 notably has a radio interface 13 towards a mobile radio network, and an Internet interface 14 towards the Internet network 12. The video server 2, the user terminal equipments 5-1 and 5-2, the transaction centre 8, and the content provider 10 notably comprise memory means 21, 22, 23, 24 and 25 respectively, processing means 31, 32, 33, 34 and 35 respectively, and an Internet interface towards the Internet network 12 referenced 41, 42, 43, 44 and 45 respectively. The user terminal equipment 5-1 and 5-2 are for example personal computers, or advanced television systems. The user terminal 5-3 is a wireless equipment. It notably comprises a Subscriber Identification Module 50, a radio transmission/reception circuit 51, memory means 52, and processing means 53. The mobile equipment 5-3 may communicate via radio links with the mobile access point 11 in order to access the Internet.

The video server 2 may receive the video 1 from the content provider 10. Video 1 is advantageously stored in memory means 21. Also stored in memory means 21 is a computer program comprising program instructions for implementing a distribution method according to the invention, when said program is executed by processing means 22.

The received video pieces and the specific program intended for reading/displaying the received video pieces are stored in the memory means of the user terminal equipments.

The invention claimed is:

1. A method for distributing a video, said video being split up into a plurality of spatial pieces encoded as independent video streams, said method comprising:

transmitting a plurality of the independent video streams to one or more users over an electronic network, conditionally offering at least one other video stream, called a missing video stream, to one or more users, transmitting said missing video stream to the user(s) who accepted said conditional offer, wherein said missing video stream is one of said plurality of spatial pieces encoded as independent video streams and the spatial pieces are not evenly sampled from the picture planes of the video.

2. A method for distributing a video as claimed in claim 1, further comprising:
protecting said missing video stream against copy.

3. A method for distributing a video as claimed in claim 2 wherein, a user is identified by a unique identifier, and said protecting further comprising:
recovering the unique identifier of the user who accepted said conditional offer, and
marking said missing video stream with said unique identifier, so as to prevent any use of said missing video stream by a user identified by another identifier.

4. A method for distributing a video as claimed in claim 1, wherein acceptance of said conditional offer by a user includes a payment from said user.

5. A method for distributing a video as claimed in claim 1, wherein said distribution is done over the Internet.

6. The method as claimed in claim 1, wherein a storage medium includes said video.

7. The method for distributing a video of claim 1, wherein each independent video stream is transmitted to the one or more users at different times.

8. The method for distributing a video of claim 1, wherein each independent video stream, other than said missing video stream, is re-transmitted from one user to another user.

9. The method for distributing a video of claim 1, wherein acceptance of said conditional offer by a user includes said user taking advertising.

10. A server for distributing a video, said video being split up into a plurality of spatial pieces, said spatial pieces being encoded as independent video streams, said server comprising:
means for transmitting a plurality of said independent video streams to one or more users over an electronic network,
means for conditionally offering at least one other video stream, called a missing video stream, to one or more users,
means for transmitting said missing video stream to the user(s) who accepted said conditional offer, wherein said missing video stream is one of said plurality of spatial pieces encoded as independent video streams and the spatial pieces are not evenly sampled from the picture planes of the video.

11. A transmission system comprising:
a server for distributing a video, said video being split up into a plurality of spatial pieces encoded as independent video streams,
a plurality of user terminal equipment, and
a transmission network,
said server comprising:
means for transmitting a plurality of said independent video streams to one or more user terminal equipment,
means for conditionally offering at least one other video stream, called a missing video stream, to the one or more user terminal equipment, and
means for transmitting said missing video stream to the user terminal equipment(s) that accepted said conditional offer, wherein said missing video stream is one of said plurality of spatial pieces encoded as independent video streams and the spatial pieces are not evenly sampled from the picture planes of the video.

12. A transmission system as claimed in claim 11, further comprising:
a transaction center for executing on-line payments upon acceptance of said conditional offer by a user terminal equipment.

13. A computer-readable medium comprising program instructions for causing a processor, to implement a method for distributing a video as claimed in claim 1, when said program is executed by said processor.

* * * * *